May 1, 1928.
W. BARFIELD
1,668,226
TOOL FOR REMOVING THE MEAT FROM CITRUS FRUITS
Original Filed Sept. 5, 1925
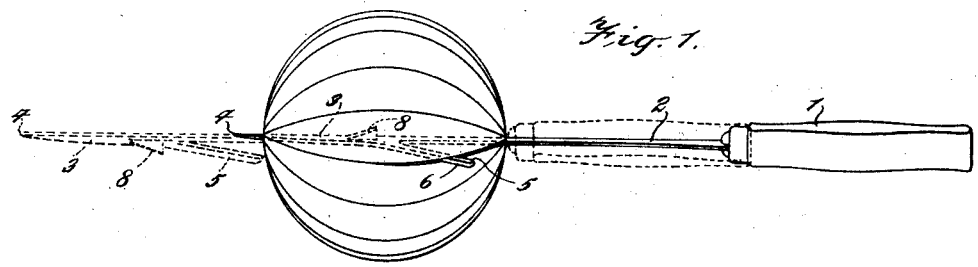
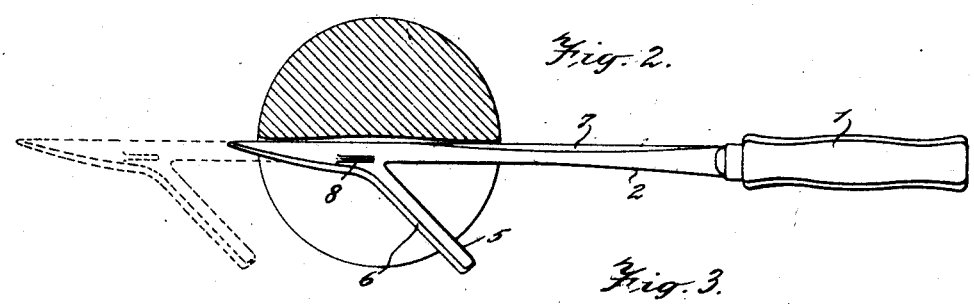
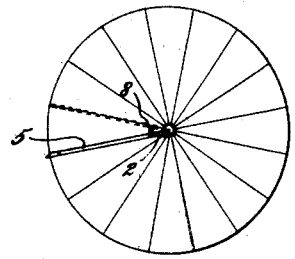
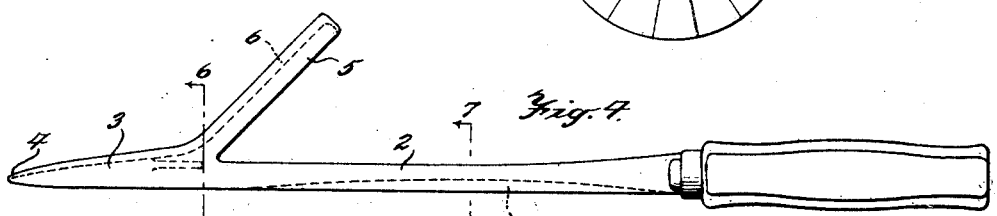
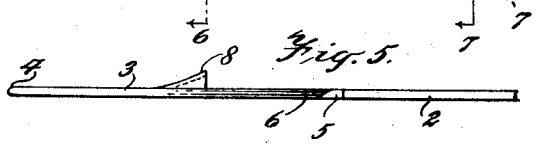
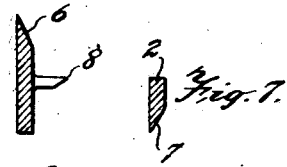
INVENTOR
William Barfield
BY
Stockbridge & Borst
ATTORNEYS Patented May 1, 1928.

1,668,226

UNITED STATES PATENT OFFICE.

WILLIAM BARFIELD, OF CLEARWATER, FLORIDA, ASSIGNOR TO THE HILLS BROTHERS COMPANY, A CORPORATION OF NEW YORK.

TOOL FOR REMOVING THE MEAT FROM CITRUS FRUITS.

Application filed September 5, 1925, Serial No. 54,653. Renewed March 15, 1928.

My invention is designed for the production of an improved tool or instrument for removing the meat from citrus fruits, the same being especially designed for use in canning factories where large quantities of such fruits are used.

The object of the invention is to produce a tool or instrument which may be readily inserted into the end of a grape fruit, orange or other citrus fruit, after the same has been peeled, provided with means for severing a section of the fruit along the side of one of the dividing walls or webs between two of the sections, and also provided with means whereby, by reversing the position of the tool or instrument, another portion of the same may be caused to move along the surface of the other dividing wall or web for the purpose of removing the section therefrom.

A further object of the invention is to provide means for slitting the sections of the fruit laterally in order to remove the seeds.

The improved tool comprises a blade having a penetrating portion at its forward end and an obliquely arranged separating arm extending from the rear of the penetrating portion, the upper edges of the penetrating portion and of the arm merging into one another. The penetrating portion and the arm are preferably beveled to produce a comparatively sharp edge, and the rear end of the blade along the edge opposite the beveled edge of the penetrating portion is preferably beveled and sharpened. On the side of the blade a cutting projection may be formed for removing the seeds.

The details of the invention will hereinafter appear, and the novel features thereof will be set forth in the claims.

In the drawings forming part of the specification,

Fig. 1 is a plan view showing in full lines my improved tool in the act of separating one of the sections of a citrus fruit and, in dotted lines, the position the tool assumes when it has been forced entirely through the fruit.

Fig. 2 is a sectional elevation of the same.

Fig. 3 is a view at right angles to Figs. 1 and 2.

Fig. 4 is an enlarged elevation of the tool or instrument.

Fig. 5 is a partial plan or edge view of the same.

Fig. 6 is a section on the line 6—6 of Fig. 4, and

Fig. 7 is a section on the line 7—7 of Fig. 5.

Like reference numerals indicate like parts in the different views.

My improved tool comprises a handle 1, and a long slender blade 2, the forward end of the latter constituting a penetrating portion 3 which is preferably about one-fourth the length of the blade 2 as a whole. The upper and lower edges of the penetrating portion 3 gradually converge toward the pointed end 4 thereof, and the blade 2 has extending upwardly and rearwardly therefrom an obliquely arranged separating arm 5. The upper edge of said arm merges into the upper edge of the penetrating portion 3, and the upper edges of these two parts are beveled on one side, as at 6, to form a dull, though somewhat sharpened, edge. The edge of the blade 2 opposite the penetrating portion 3 is flat, whereas the remaining portion of the blade 2 is beveled, as shown at 7, on the same side of the blade that the arm 5 and penetrating portion 3 are beveled. Extending laterally from the blade 2, preferably upon the same side of the blade as the bevels 6 and 7, is a cutting projection or blade 8. The cutting edge of the blade 8 tapers from its rear end forwardly and is preferably rather sharp.

In using the device, the grape fruit, for example, is cut off at the ends of the core thereof, peeled, and the fibrous portion inside the skin carefully removed by a sharp knife. My improved tool is then introduced at one end of the core and the penetrating portion caused to pass through the fruit in line with the core. In so doing, downward movement of the blade is resisted by the flattened lower edge of the penetrating portion and the latter is caused to traverse the side of the section within the dividing wall or web between that section and the one next adjacent thereto. The inclined edge of the penetrating portion 3 acts to gradually separate the meat section from the web, until it has been introduced to a considerable extent, and then the beveled edge of the arm 5 acts to complete the separation. By having the beveling 6 on the right hand side of the arm 5 and penetrating portion 3, and first acting upon the left side of the meat section, the edges of the tool are caused to hug closely the sides of the dividing wall or web so that all of one side of the section is separated from the web without breaking any of the cells of the meat. The tool is passed all the way through the fruit, as shown in dotted lines in Figs. 1 and 2. In passing through the fruit the cutting blade 8 cuts the section along the apex thereof and provides for the ready removal of the seeds which are located at that portion of the section. After the blade has been passed entirely through the fruit, the position of the same is reversed by rotating it. The rear portion of the blade, that is, that portion adjacent to the handle 1, is now brought into action. It is raised bodily and the beveled edge 7 thereof is caused to traverse the section of the fruit along the inner side of the dividing wall or web between it and the next adjoining section to the right. It will be observed that the beveling 7 at the rear portion of the blade 2 is on the same side as the beveling 6 on the arm 5 and penetrating portion 3 of the blade. Consequently, when the blade 2 is raised to complete the removal of the fruit section, the right hand side of the blade is caused to hug the left hand side of the web or dividing wall so that the meat section is completely removed without breaking any of the cells of the section.

I claim:

1. A tool for removing the meat from citrus fruits, comprising a blade having a penetrating portion at its forward end and an obliquely-arranged separating arm extending from the rear of the penetrating portion, the upper edges of said penetrating portion and of said arm merging into one another.

2. A tool for removing the meat from citrus fruits, comprising a blade having a penetrating portion at one end thereof provided with converging upper and lower edges and an obliquely arranged separating arm whose upper edge merges into and forms a continuation of the upper edge of said penetrating portion.

3. A tool for removing the meat from citrus fruits, comprising a blade having a penetrating portion at one thereof provided with converging upper and lower edges and an obliquely arranged separating arm, the upper edges of said penetrating portion and of said arm being beveled and merging into one another and the lower edge of said penetrating portion being unbeveled.

4. A tool for removing the meat from citrus fruits, comprising a blade having a beveled edge at its rear end, a penetrating portion at its forward end and an obliquely arranged separating arm, the upper edges of said penetrating portion and of said arm being beveled and merging into one another.

5. A tool for removing the meat from citrus fruits comprising a blade having an obliquely-arranged separating arm and a laterally-extended cutting projection thereon.

In witness whereof, I hereunto subscribe my signature.

WILLIAM BARFIELD.